United States Patent
Kasanic et al.

(10) Patent No.: US 6,912,834 B2
(45) Date of Patent: Jul. 5, 2005

(54) NOZZLE FOR MOWER DECK

(75) Inventors: Joe Kasanic, Medina, OH (US); Peter D. Sadosky, Parma, OH (US)

(73) Assignee: MTD Products Inc., Valley City, OH (US)

( * ) Notice: Subject to any disclaimer, the term of this patent is extended or adjusted under 35 U.S.C. 154(b) by 0 days.

(21) Appl. No.: 10/424,301

(22) Filed: Apr. 28, 2003

(65) Prior Publication Data

US 2004/0221556 A1 Nov. 11, 2004

(51) Int. Cl.⁷ .............................................. A01D 19/00
(52) U.S. Cl. ................................................................ 56/16.8
(58) Field of Search ..................................... 56/1, 16.8

(56) References Cited

U.S. PATENT DOCUMENTS

| | | | |
|---|---|---|---|
| 1,336,257 A | | 4/1920 | Muzzy |
| 1,631,381 A | | 6/1927 | Nelson |
| 1,752,823 A | | 4/1930 | Walker |
| 2,155,220 A | | 4/1939 | Ehret |
| 2,504,416 A | * | 4/1950 | Hileman ..................... 56/12.2 |
| 2,566,324 A | | 9/1951 | Frese |
| 2,639,947 A | | 5/1953 | Tramm et al. |
| 2,650,132 A | | 8/1953 | Reinecke |
| 2,742,751 A | | 4/1956 | Laughlin |
| 2,796,714 A | | 6/1957 | Denney |
| 2,936,563 A | | 5/1960 | Blume |
| 2,939,636 A | * | 6/1960 | Mullin .................. 239/214.21 |
| 2,984,061 A | | 5/1961 | Stabnau |
| 2,992,524 A | | 7/1961 | Stabnau |
| 3,040,990 A | | 6/1962 | Gotti |
| 3,112,596 A | | 12/1963 | Price |
| 3,214,893 A | | 11/1965 | Griffin |
| 3,490,212 A | | 1/1970 | Hengesbach |
| 3,535,862 A | * | 10/1970 | Wittwer ...................... 56/17.5 |
| 3,791,116 A | * | 2/1974 | Wykhuis ..................... 56/17.5 |
| 5,027,590 A | | 7/1991 | Stark |
| 5,042,242 A | | 8/1991 | Evans |
| 5,090,183 A | | 2/1992 | Thorud et al. |
| 5,094,066 A | | 3/1992 | McBride et al. |
| 5,189,869 A | | 3/1993 | McBride et al. |
| 5,237,803 A | | 8/1993 | Domingue, Jr. |
| 5,312,047 A | | 5/1994 | Akers |

(Continued)

FOREIGN PATENT DOCUMENTS

| | | |
|---|---|---|
| DE | 31 51 770 C2 | 12/1990 |
| DE | 94 16 799.0 | 1/1995 |
| DE | 195 11 217 C1 | 6/1996 |
| DE | 199 25 605 A1 | 12/2000 |
| EP | 0 923 852 A1 | 12/1998 |
| FR | 2 677 903 A1 | 6/1991 |

*Primary Examiner*—Thomas B. Will
*Assistant Examiner*—Alicia Torres
(74) *Attorney, Agent, or Firm*—Wegman Hessler & Vanderburg

(57) ABSTRACT

A water nozzle is attached to the mower deck of vegetation mower that extends into the interior of the mower deck housing. Water is channeled into the water nozzle and is diverted laterally out through an end of the nozzle toward the mower blade in the housing deck for use in cleaning the interior sides of the mower deck housing. The water may contact the mower blade to be propelled to the sides of the mower deck housing. The nozzle may be rotatably attached with respect to the deck to use in manually turning the nozzle cleaning the entire periphery of the interior of the mower deck housing.

13 Claims, 8 Drawing Sheets

U.S. PATENT DOCUMENTS

| | | | |
|---|---|---|---|
| D350,357 S | * 9/1994 | Maine | D15/17 |
| 5,444,967 A | 8/1995 | Meuth | |
| 5,456,412 A | 10/1995 | Agee | |
| 5,499,492 A | 3/1996 | Jameson | |
| 5,651,242 A | 7/1997 | Kittridge | |
| 5,673,856 A | 10/1997 | Krohn | |
| 6,125,621 A | 10/2000 | Burch | |
| 6,145,288 A | * 11/2000 | Tamian et al. | 56/16.8 |
| 6,260,340 B1 | * 7/2001 | Sanner | 56/16.8 |
| 6,497,088 B1 | * 12/2002 | Holley | 56/16.8 |
| 6,581,363 B1 | * 6/2003 | Hall | 56/12.1 |
| 2002/0170281 A1 | 11/2002 | Brown | |

* cited by examiner

NOZZLE FOR MOWER DECK

BACKGROUND OF THE INVENTION

A. Field of Invention

This invention pertains to the art of methods and apparatuses for cleaning the interior of a mower deck.

B. Description of the Related Art

It is known in the art that vegetation clippings gather on the under side of a mower deck during the mowing of grass or other vegetation. The clippings prevent efficient operation of the mower deck. It is therefore desirable to keep the under side of the mower deck clean.

Cleaning the under side of a mower deck may require the operator to disconnect the mower deck and/or flip over the mower deck to gain access to the under side. This process can be cumbersome and messy. In that mower decks and the mowers to which they are attached are heavy, it may be difficult to flip over the mower deck.

One type of cleaning apparatus for mower decks includes water nozzles fixedly attached to a mower deck; the water nozzle having a discharge end disposed interior to the mower deck housing and positioned facing toward the ground. In this manner, the water simply drips out of the end water nozzle. Supply water is connected to an inlet end of the nozzle extending exterior to the mower deck housing. One aspect of this type of nozzle is that the water is simply dropped vertically from the nozzle discharge end onto the mower blade, wherein the water is subsequently dispersed about the interior on the mower deck during operation thereof. However, this is inefficient for cleaning the entire surface of the interior of the mower deck unless numerous water nozzles are implemented.

The present invention provides methods and apparatuses for cleaning the interior side of a mower deck without having to maneuver the mower and by introducing water to clean the under side of the mower deck in an effective manner by uniquely positioning and orienting water nozzles with respect to the rotation of the mowing blades. This is accomplished in a way that minimizes the number of nozzles required to clean the mower deck

SUMMARY OF THE INVENTION

According to one aspect of the present invention, a new and improved method of cleaning the under side of a mower deck with water is provided.

One aspect of the present invention includes a water nozzle fixed to the mower deck, wherein the water nozzle directs water to the mower blade for cleaning both the blades and the interior of the mower deck. The water nozzle is oriented to direct the water stream spray width tangential to the rotation of the mower blades.

The present invention includes a water nozzle having first and second ends. The nozzle is connected to a mower deck housing such that the first end of the nozzle extends into the interior region of the deck housing. The second end of the nozzle extends outward exterior to the deck housing. The nozzle has longitudinally fashioned therein an aperture for channeling water through the nozzle. The first end of the nozzle includes side bores that laterally direct the flow of water within the mower deck housing. This acts to clean the interior sides of the deck housing and the blades.

Still other benefits and advantages of the invention will become apparent to those skilled in the art to which it pertains upon a reading and understanding of the following detailed specification.

BRIEF DESCRIPTION OF THE DRAWINGS

The invention may take physical form in certain parts and arrangement of parts, a preferred embodiment of which will be described in detail in this specification and illustrated in the accompanying drawings which form a part hereof and wherein.

DESCRIPTION OF THE PREFERRED EMBODIMENT

Figure 1:
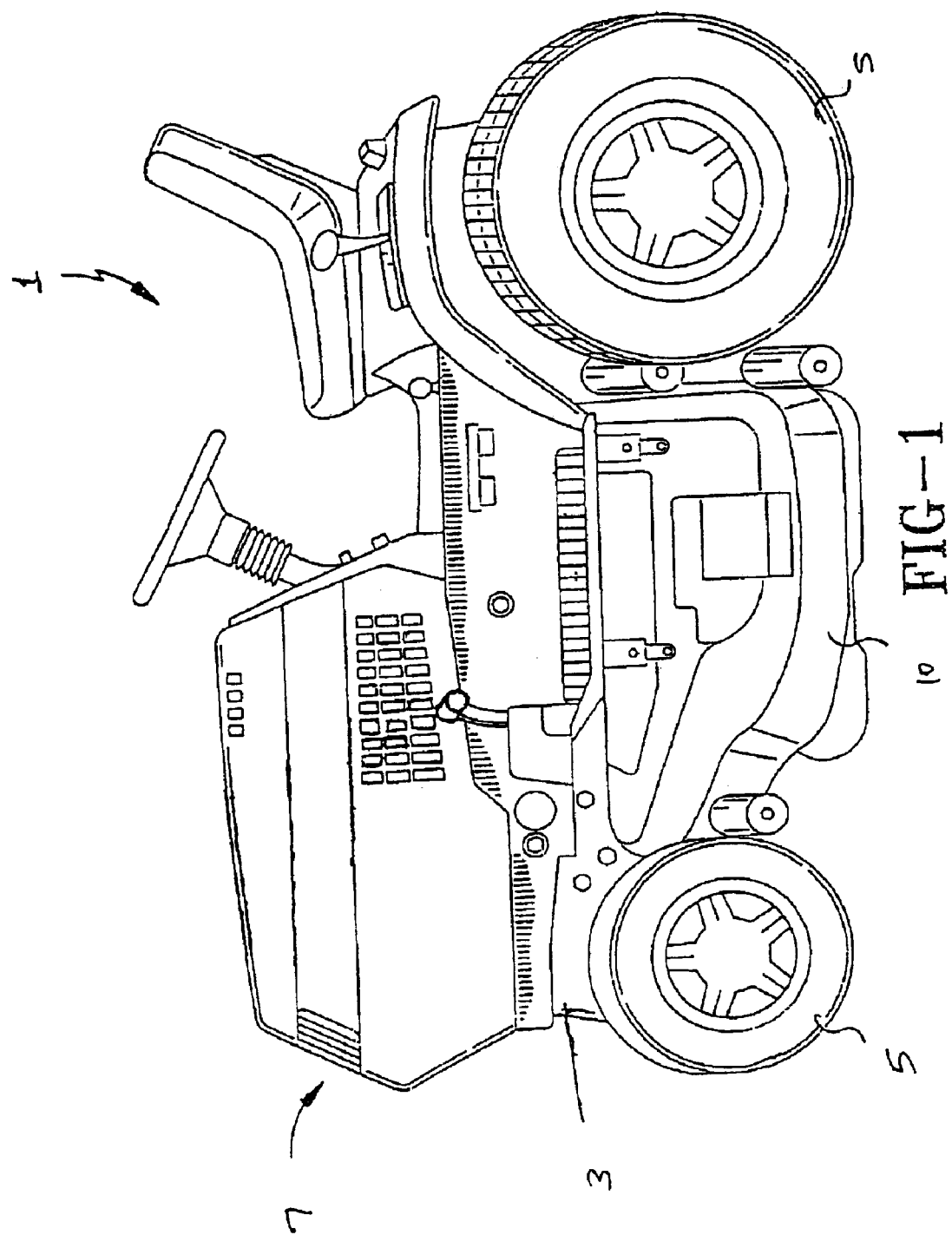
FIG. 1 is a side view of a mower with a mower deck.

Referring now to the drawings wherein the showings are for purposes of illustrating a preferred embodiment of the invention only and not for purposes of limiting the same, FIG. 1 depicts a riding vegetation mower shown generally at 1. The riding mower 1 may include a frame 3 providing structural support for the mower 1, wheels 5 for use in providing mobility to the mower and an engine 7 for use in providing power to the mower 1. A mower deck 10 is attached to the frame 3 of the mower 1 in a manner well known in the art and may be selectively removable. It is also contemplated that the mower deck may be permanently attached to the frame of a mower, as is the case of walk-behind mower not shown in the figures. It is noted at this point that as the present invention relates to a mower deck, the invention is not limited to a mower deck attached to a riding mower but may apply to a mower deck permanently attached to or selectively detachable from any vegetation cutting device.

Figure 2:
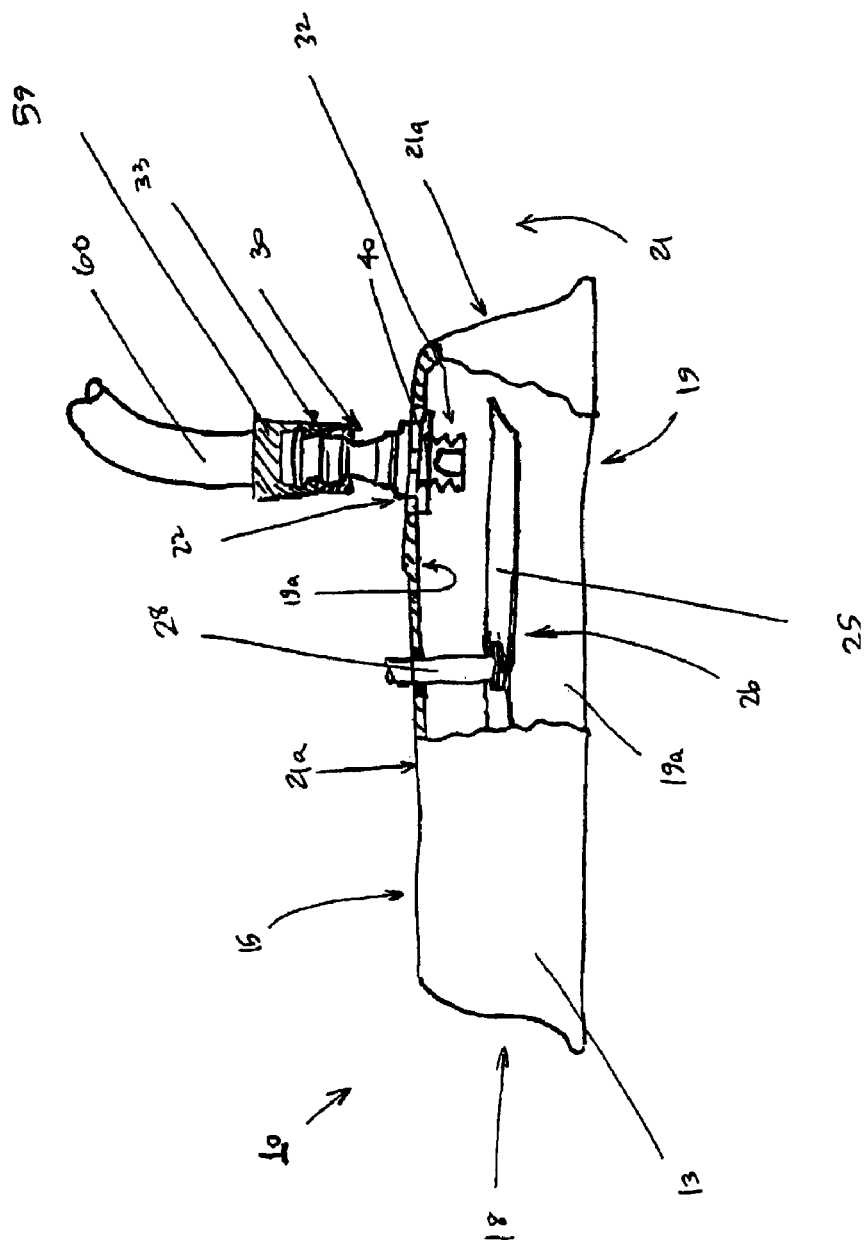
FIG. 2 is a side view of the mower deck with nozzle and water conduit.

With reference now to FIG. 2, a mower deck 10 incorporating the present invention is shown. In the preferred embodiment, the mower deck 10 includes a housing 13. The housing 13 may include a top wall 15 and sidewalls 18 that extend around a periphery of the top wall 15. In this manner, the walls 15, 18 formed a concave deck housing 13 defining an interior region 19 and an exterior region 21. Similarly, the deck housing 13 may include an interior surface 19a and an exterior surface 21a. A mowing blade 25 is rotatably attached to the deck housing 13. The mowing blade 25 may include a spindle 26 and shaft 28 that extends from the interior 19 of the deck housing 13 to the exterior 21. The shaft 28 may be communicated to a power take off shaft, not shown, in a manner well known in the art. It is expressly noted that any means of communicating power from the engine to drive the shaft 28 and mowing blade 25 may be chosen with sound engineering judgment.

Figure 3:
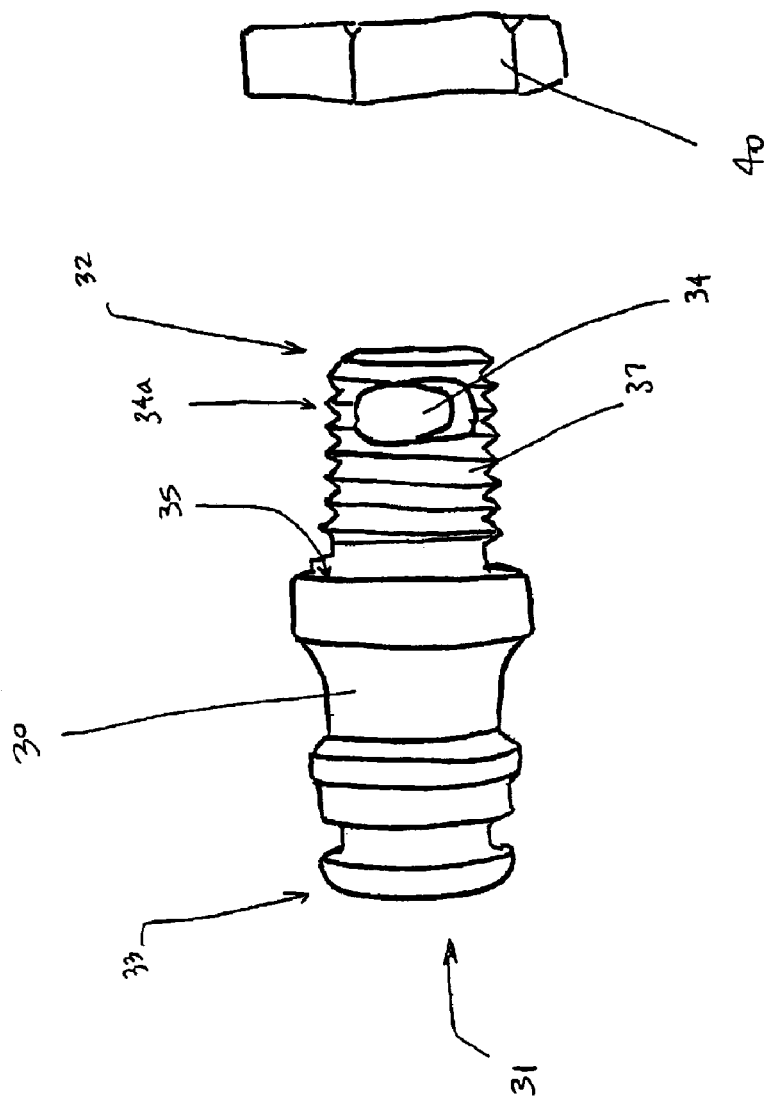
FIG. 3 is a side view of the water nozzle.

With continued reference to FIG. 2 and now to FIG. 3, a cleaning nozzle 30 is depicted attached to the top wall 15 of the deck housing 13. The cleaning nozzle 30 may be a water nozzle 30 having first and second ends 32, 33 respectively. The nozzle 30 may be inserted through an aperture formed in the top wall 15 of the deck housing 13. The aperture may be sized to allow a first mounting surface 35 of the nozzle 30 to abut the exterior surface 21a of the top wall 15. In this manner, the first end 32 of the nozzle 30 extends into the interior region 19 of the deck housing 13 and the second end 33 of the nozzle 30 is disposed about the exterior region 21 of the top of the deck housing 13. The first end 32 of the nozzle 30 may include threads 37 that engage a fastening nut 40. As is well known in the art, the fastening nut 40 may include threads, not shown, fashioned about a hole in the fastening nut 40 that mate with the threads 37 of the first end 32 of the nozzle 30. When the first end 32 of the nozzle 30 is inserted through the aperture formed in the wall 15, the fastening nut 40 may be threaded onto the threads 37 of the nozzle 30 and tightened to fixedly secure the nozzle 30 to the deck housing 13. Alternately, the first end of the nozzle 30 may be constructed of a resiliently deformable material such that the nozzle may be snap fit into the aperture. However, any means of mounting the nozzle 30 into the aperture of the mower deck may be chosen with sound engineering judgment.

Figure 4:
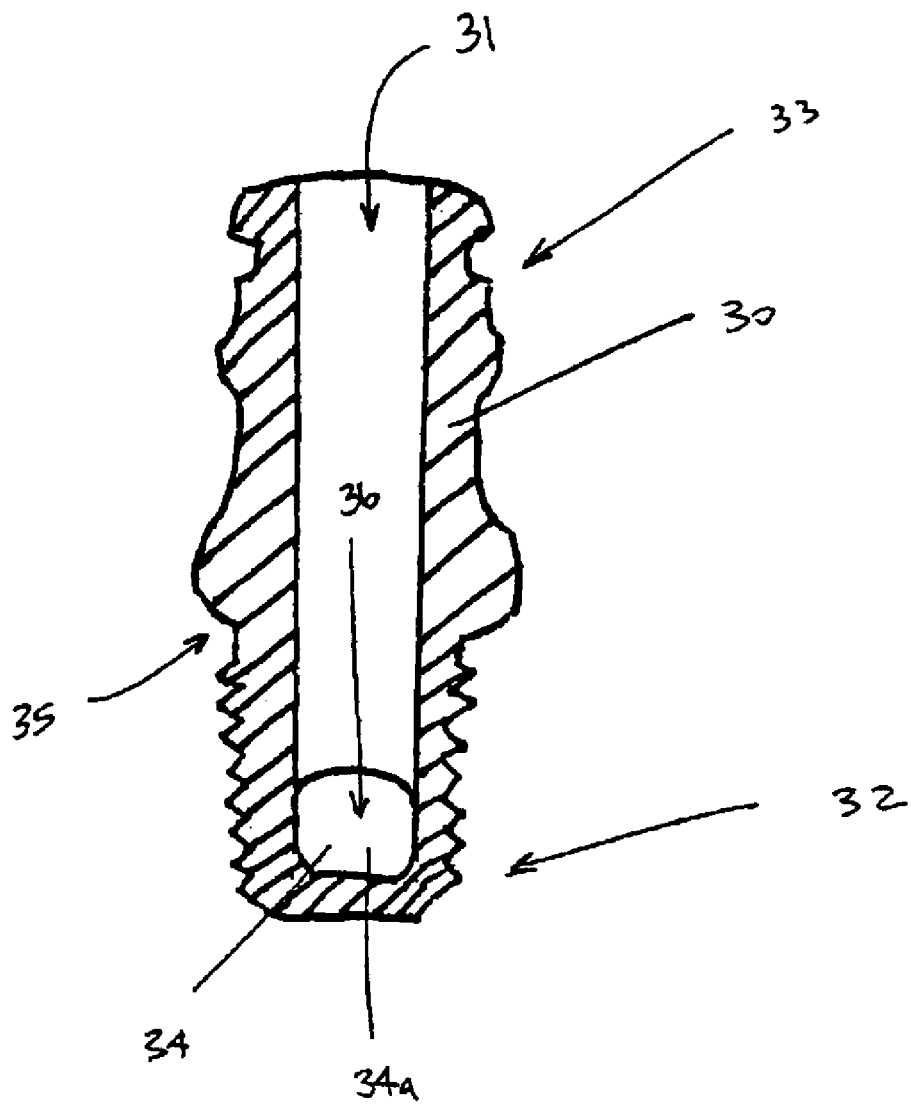
FIG. 4 is a cross section view of the water nozzle.

With continued reference to FIG. 3 and now to FIG. 4, the nozzle 30 may have a nozzle bore 31 fashioned in the second end 33 of the nozzle 30 and traversing longitudinally to the first end 32. It is noted the nozzle bore 31 stops short, in a longitudinal direction, from the first end 32 of the nozzle 30. Subsequently, side bores 34, 34a may be fashioned axially in the first end 32 of the nozzle 30 connecting with the longitudinally fashioned nozzle bore 31 to form a channel 36. In this manner, the channel 36 may direct water, communicated from a water conduit to be discussed in a subsequent paragraph, through the nozzle 30 into the interior region 19 of the deck housing 13. It is expressly noted that the water directed through the channel 36 changes direction from a downward or longitudinal direction to a lateral direction as clearly shown in the Figures. As water is supplied under pressure, the water is directed onto the mowing blade 25, which may be rotating, to the interior surface 19a of the deck housing 13 to clean the surface 19a of the deck housing 13.

Figure 5:
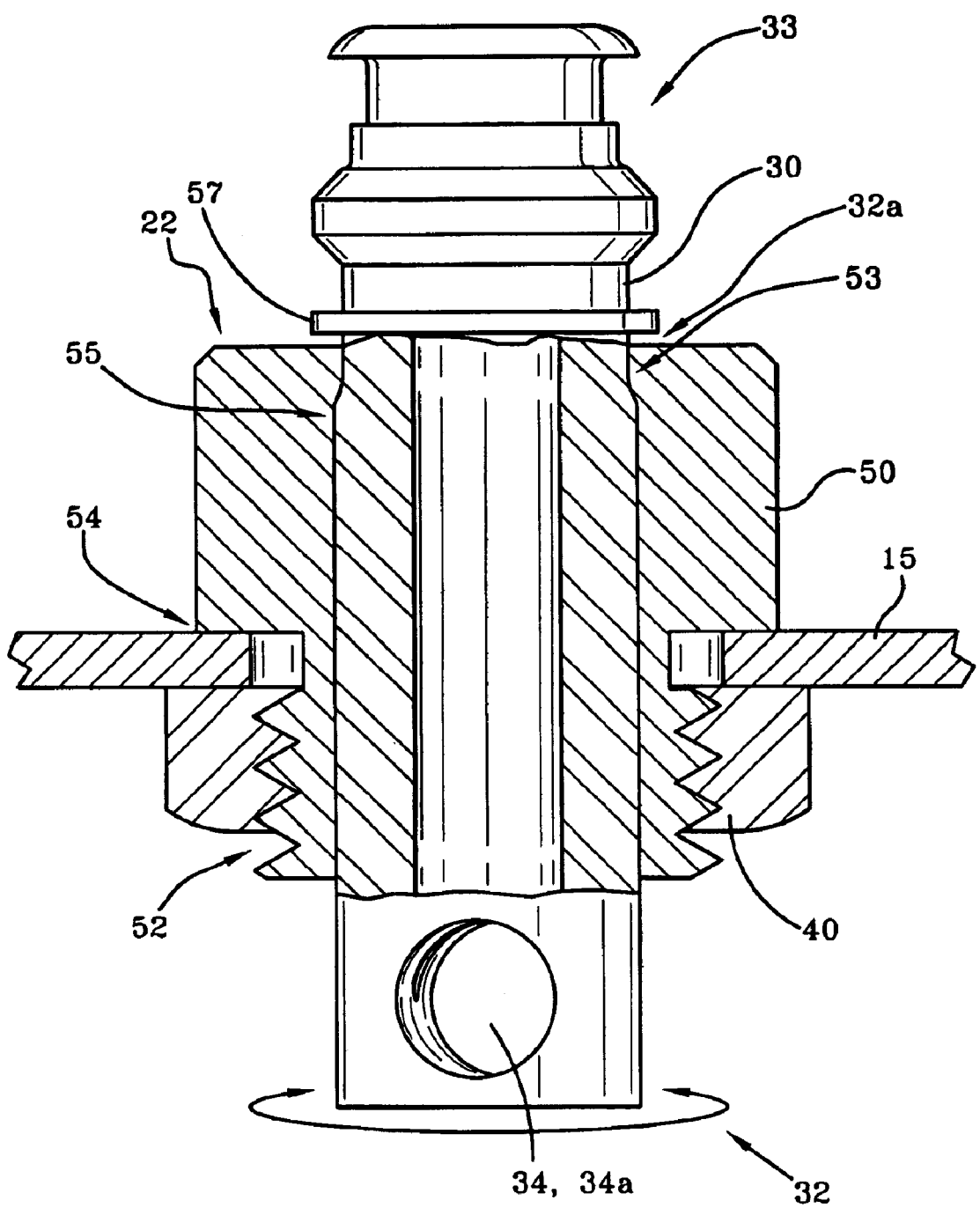
FIG. 5 is a partial cross section view of the water nozzle of an alternate embodiment.

With reference now to FIG. 5, an alternate embodiment of a nozzle that may be used with this invention is shown. The nozzle 30 may be received into a bushing 50. In this embodiment, the bushing 50 is received into the aperture 22 of the top wall 15 of the deck housing 13. The bushing 50 may have a first threaded end 52 and a second end 53 having flats 54 that abut the exterior surface of the top wall 15. In this manner, the bushing is prevented from slipping through the aperture 22 into the interior region 19. Similar to the preferred embodiment, the fastening nut 40 may be screwed onto the threads of the bushing 50 fixedly securing the bushing to the deck housing 13. The nozzles 30 may include a reduced diameter portion 32a. This creates a seat portion 53 that seats against a counterbore 55 in the bushing 50. In this manner, the nozzle 30 is prevented from sliding upward out the top of the deck housing 13 because of the counterbore portion 55 that contacts the seat portion 53 of the nozzle 30. Additionally, a snap ring 57 may be secured to a groove, not shown, fashioned in the nozzle 30 to prevent the nozzle 30 from sliding downward into the interior region 19 of the deck housing 13. The bushing clearance with respect to the outer dimension of nozzle 30 may be slip fit such that the nozzle 30 may be turned or rotated with respect to the bushing 50 and the deck housing 30. In this manner, the nozzle 30 is rotatably connected with respect to the mower deck and the deck housing 13. It is noted that manually rotating the nozzle 30 selectively directs the water flowing laterally out from the first end 32 of the nozzle 30. As the nozzle is rotated through 180 degrees, the water is directed to clean to the entire 360 degree interior surface 19a. The amount of slip fit between the nozzle 30 and the bushing 50 may be chosen with sound engineering. Additionally, any type of material for constructing the nozzle and the bushing may be chosen with sound engineering judgment.

With reference again to FIGS. 2 and 3, in the preferred embodiment, the nozzle 30 may have a quick disconnect second end 33. That is to say, that the configuration of the second end 33 of the nozzle 30 may be adapted to received a water conduit 60 having a quick release fitting 59. In that quick release fittings are well known in the art, no further explanation will be offered at this point. As previously mentioned, the nozzle 30 may receive a water conduit 60 through which water flows under pressure to be diverted from the side bores 34, 34a to the interior surface 19a of the deck housing 13. In this manner, the water is diverted onto the mowing blade 25 to the sides of the deck housing 13. In other words, the cleaning action of the water flowing through the nozzle 30 utilizes the motion of the mowing blade 25 to propel the water for cleaning purposes.

Figure 6:
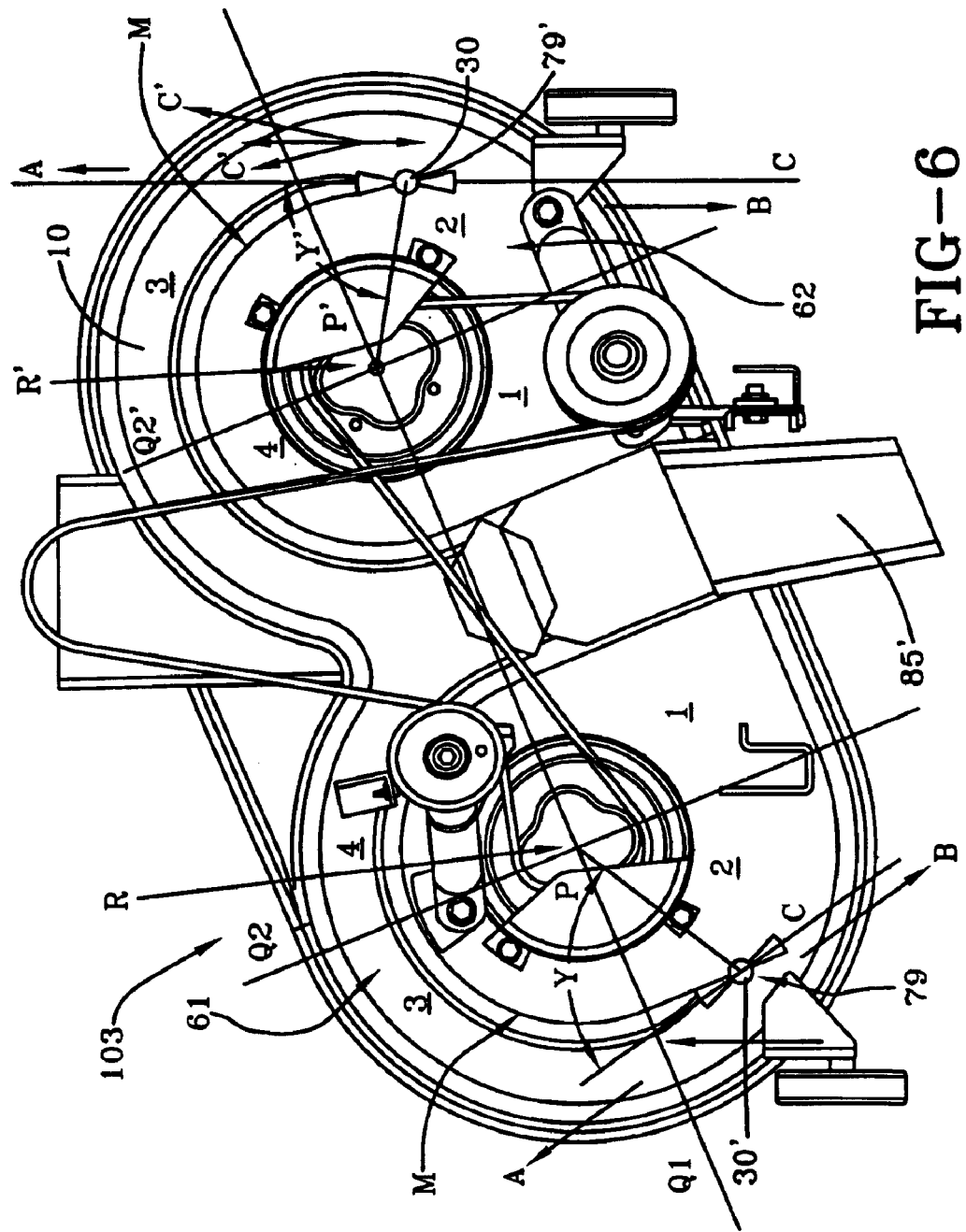
FIG. 6 is a bottom view of a two-bladed rear discharge mower deck with two water nozzles.

With reference now to FIG. 6, a two blade rear discharge deck is shown. The mower deck 10 may include first and second mowing blades, shown generally at 61, 62. For this embodiment, the mowing blades 61, 62 are counter rotating. In other words, the first mowing blade 61 may rotate clockwise and the second mowing blade 62 may rotate counterclockwise. This functions to draw the severed vegetation into the center of the mower deck 10 for center discharge, which may be rearward center discharge. However, it should be noted that the mower deck 10 may alternately be a side discharge mower deck to be discussed in a subsequent paragraph. The mower deck 10 may also include first and second nozzles 30, 30' attached thereto in a manner described above. The nozzles 30, 30' may have a spray width ranging from 10 degrees to 60 degrees. However, preferably the spray width ranges from 20 degrees to 30 degrees. In the one embodiment, the spray width is 25 degrees. The nozzles 30, 30' may be positioned proximate to the outer periphery of the mower deck 10. In the preferred embodiment, the nozzles 30, 30' may be directed such that the centerline of water discharge C is substantially tangent to a circle M defined by the rotation of the mowing blades 61, 62 respectively. In this manner, the 25 degrees spray width overlaps the rotation of the blades, as well as allows the nozzle to direct water toward the sides of the mower deck 10. It should be noted that the water is sprayed from the nozzle in two substantially opposite directions, as shown in the figures. This directs water in a first direction A against the rotation of the mowing blades 61, 62 and in a second direction B with the motion of the mowing blades 61, 62 respectively. It should be noted that the present embodiment of the subject invention is directed toward utilizing two nozzles. This is important because the position and orientation of the two (2) nozzles is effective in cleaning substantially the entire interior of the mower deck 10, which reduces cost while still accomplishing the intended desire of cleaning debris from the interior of the mower deck 10 with water.

With continued reference to FIG. 6, the orientation of the nozzles 30, 30' will now be discussed. The nozzles 30, 30' may be oriented so that the water stream in channeled to direct water partially onto the blades and partially onto the sides of the mower deck 10. A line P, P' is defined by the center of the nozzles 79, 79' and the center point of rotation R, R' of the mowing blades respectively. The water nozzles 30, 30' may be respectively oriented such that an angle Y, Y' is formed between the centerline of water discharge C, C' and the line P, P' respectively. The angle Y, Y' may be chosen such that the water stream discharges water substantially tangential to the circumference defined by the mowing blades and such that the water does not spray directly on the mowing blade spindles respectively. In this manner, the water may be channeled partially onto the blades and partially onto the mower deck sides. For example, utilizing a spray width of 25 degrees, the angle Y, Y' may be 85 degrees. In this way, 17.5 degrees of the water stream is directed over the mowing blade. The angle Y, Y' may range from 50 degrees to 130 degrees. However, any angle Y, Y' may be chosen with sound engineering judgment as is appropriate for cleaning the interior of the mower deck 10. The above mentioned orientation of the nozzles is effective for dispensing water such that the water is carried by the momentum of rotating blades 61, 62 and propelled throughout the interior of the mower deck 10. In other words, the centerline of discharge of the nozzles may be oriented substantially tangent to the circumference defined by the mowing blades. And alternately, the centerline of discharge may be oriented at angle with respect to a tangent line of the circumference of travel of the mowing blades in either direction by up to 40 degrees.

Figure 7:
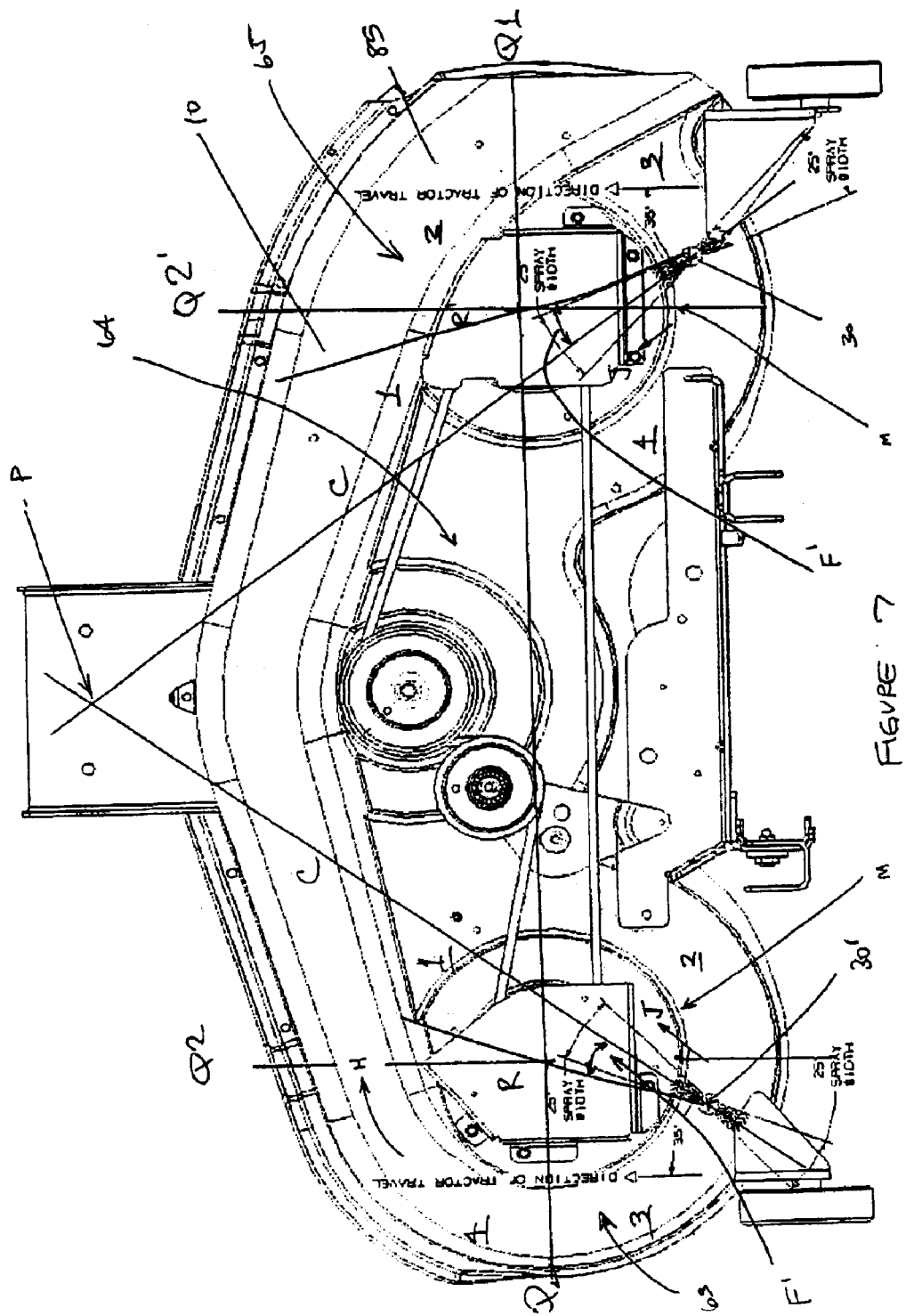
FIG. 7 is a bottom view of a three-bladed mower deck with only two water nozzles.

With reference now to FIG. 7, an alternate embodiment of the multi-nozzle mower deck is shown having three (3) mowing blades, shown generally at 63, 64, and 65. The mowing blades 63, 64 and 65 may rotate in the same direction, which may be a clockwise direction H. The nozzles 30, 30' may be oriented such that the centerline of water discharge C is substantially perpendicular to a tangent of the circle M, as defined by the rotation of the mower blade. Additionally, the nozzles 30, 30' are positioned such that the respective centerlines of discharge C of each nozzle 30, 30' may intersect at a point P within the interior of the mower deck 10. In this embodiment, the entire spray width of the water stream is directed onto the circumference of the rotating mower blade 63, 65 thus directly spraying all of the water being dispensed in a first direction onto the blade 63, 65 for cleaning purposes. The opposite end direction of water discharge is therefore directed onto the sides of the interior of the mower deck 10. The centerlines of water discharge C of the nozzles 30, 30' may form an angle F' with a line defined between the center of the nozzle and the center of the mowing blade rotation R, R'. The angle F' may be chosen such that the water stream is directed onto the mower blades. In one embodiment, angle F' ranges from −20 degrees to +20 degrees. It should be noted that both centerlines of discharge direct inward in a first water stream direction J. This serves to effectively introduce the water stream into the pathway of motion of the rotating blades, which propels the water about the interior of the mower deck.

Figure 8:
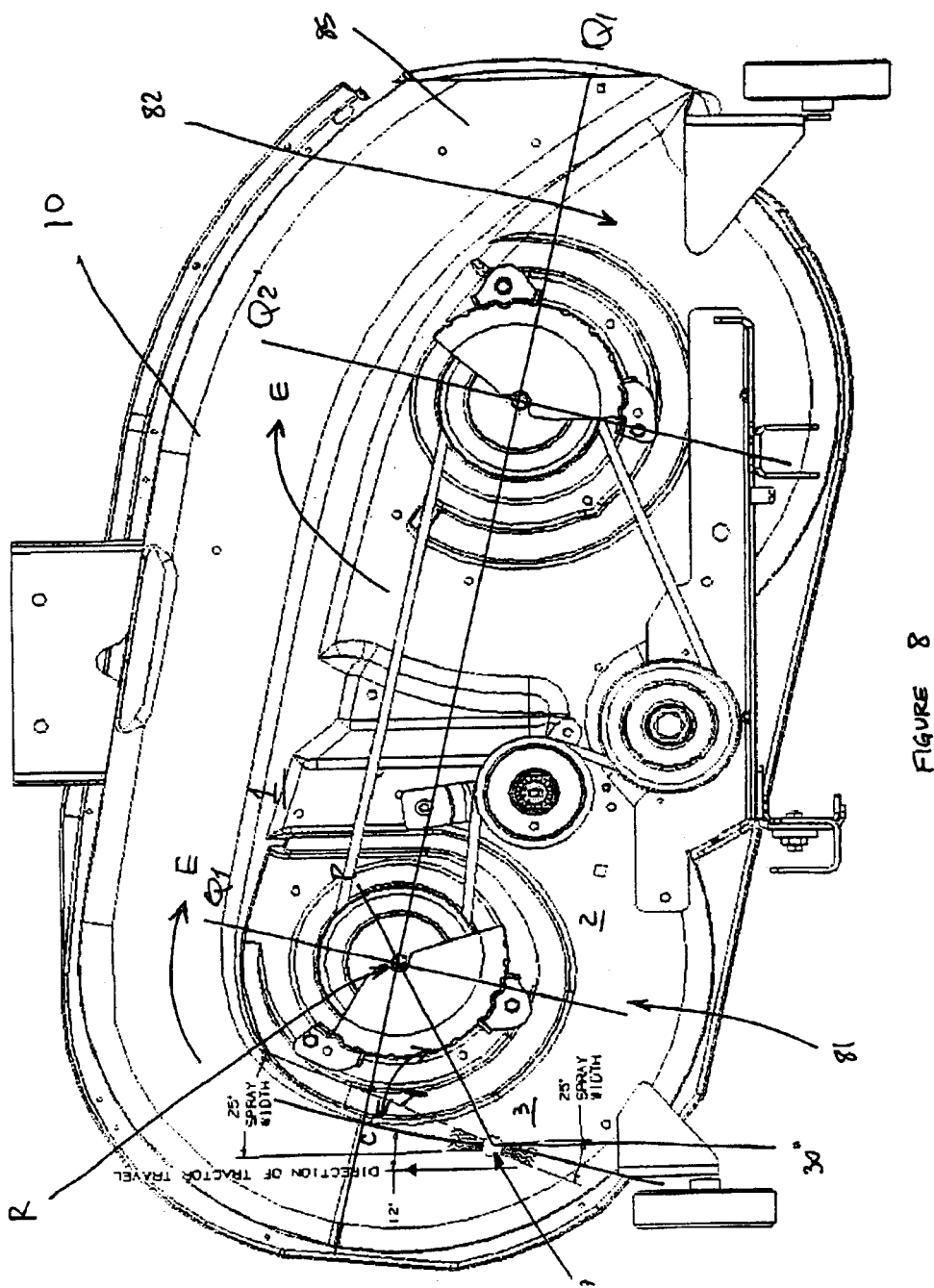
FIG. 8 is a bottom view of a two-bladed side discharge mower deck with only a single water nozzle.

With reference now to FIG. 8, an alternate embodiment of a single nozzle mower deck is shown having two mowing blades with a side discharge. The mowing blades 81, 82 rotate in the same direction E directing the severed debris out the side discharge chute 85. In this embodiment, the nozzle 30" may be position proximate to the outer periphery of the mower deck 10. The nozzles 30" may be directed such that the centerline of water discharge C is directed onto the mowing blade 81 proximate to the nozzle 30". It is noted that the water stream is not directed onto the spindle of the proximate mowing blade 81, but onto the blade 81 itself. The spray width of the nozzle 30" may be chosen as described above, which may be 25 degrees but may also range from range 20 degrees to 30 degrees. In this manner, the spray width overlaps the rotation of the blade 81 wherein the water is directed onto the second blade 82 for use in cleaning debris off of the blades 81, 82, as well as the interior of the mower deck 10. It should be noted again that the water is sprayed from the nozzle in two substantially opposite directions, as shown in the figures. The angle Y, as defined above, for this embodiment may range from 50 degrees to 130 degrees. It is noted that both the embodiment of FIG. 6 and that of FIG. 8 utilize one less water nozzle than the number of mowing blades present in the mower deck. In this manner, effective use of a minimal number of nozzles is incorporated while effectively cleaning the interior of the mower deck 10.

With reference to FIG. 6, a mowing blade radius L is defined from the center point of rotation of the mowing blade to the outer edge of the blade. The nozzles 30, 30', 30" respectively may be positioned substantially at a radius L from the center of rotation of the mowing blades proximate to the respective nozzle. This functions to direct water onto the outermost edge mowing blade where the greatest momentum of the mowing blade can distribute water about the interior of the mower deck 10. However, the nozzles 30, 30', 30" may also be positioned at a radius from the center of rotation within the range of minus 0.8 L to plus 1.2 L. It should be noted that a longer radius, that is the "plus" radius, may be limited by the position of the interior walls of the mower deck 10.

With continued reference to FIGS. 6 through 8, the nozzles 30, 30', 30" may be placed in one of four quadrants. The four quadrants may be defined in part by a first axis having axis points coincident with the center points of rotation of the outermost mowing blades. Each mowing blade 61, 62, 63, 65, 81, has four quadrants directly surrounding the mowing blade center of rotation and which in one of the quadrants the cleaning nozzle may be placed. In FIG. 6, mowing blades 61, 62 have respective centers of rotation R, R'. The first axis Q1 is defined by points R, R'. Second axes Q2, Q2' are defined for each blade center R, R' as a line perpendicular to the first axis Q1 and passing through the respective mowing blade centers of rotation R, R'. Resultantly, Axes Q1 and Q2, Q2' respectively define the four quadrants around the centers of rotation R, R' of the mowing blades. The four quadrants of each mowing blade center may be labeled Quadrants 1 through 4. For the embodiment shown in FIG. 6 having two mowing blades 61, 62 with a center discharge, Quadrant 1 is defined as the quadrant closest to the center discharge chute 85' debris exiting point, as shown in FIG. 6. Quadrants 2 through 4 are labeled successively following the direction of travel of the mowing blade. In this manner, the nozzles 30, 30' may be placed in the second quadrants respectively at a radius and orientation as defined above. The placement of the nozzle 30, 30' in this manner maximizes the effective cleaning power of the 25 degree spray width water stream in cleaning the interior of the mower deck 10.

With reference to FIGS. 7 and 8, alternate embodiments of mower deck configurations and nozzle placement will now be discussed. FIGS. 7 and 8 depict a side discharge debris chute 85. In these embodiments, the mowing blades 63, 65 and 81, 82 rotate in the same direction respectively, namely clockwise. For the embodiments of FIGS. 7 and 8, Quadrant 1 is defined as the quadrant closest to the discharge chute 85 and interior to the mower deck 10. By interior it is meant that that portion of the mower deck between the center points of rotation of the mowing blades is the interior part of the mower deck. This is contrasted to the area between center points of rotation and the wall of the mower deck. Quadrants 2 through 4 are labeled successively following the direction of travel of the mowing blades. Utilizing this convention, the nozzles 30, 30', 30" may be located in Quadrants 3 respectively at a radius and orientation as defined above. The placement of the nozzle 30, 30', 30" in this manner maximizes the effective cleaning power of the 25 degree spray width water stream in cleaning the interior of the mower deck 10. It is again noted that for the embodiment of FIG. 8 only one nozzle exists which effectively cleans the mower deck 10 because of the position and orientation of the nozzle 30".

The preferred embodiments have been described, hereinabove. It will be apparent to those skilled in the art that the above methods may incorporate changes and modifications without departing from the general scope of this invention. It is intended to include all such modifications and alterations in so far as they come within the scope of the appended claims or the equivalents thereof.

Having thus described the invention, it is now claimed:

1. A mower deck comprising;
   a mower deck housing having an inner surface and an outer surface;
   at least a first cutting blade rotatably connected with respect to the mower deck housing, the at least a first cutting blade disposed interior to the mower deck; and
   at least a first nozzle having first and second ends, the first end of the at least a first nozzle extending into the interior of the mower deck housing, the second end of the nozzle extending exterior to the mower deck housing, wherein the at least a first nozzle includes an aperture for discharging an associated water stream having a spray width ranging between substantially 20 and 30 degrees, the at least a first cutting blade defining a circumference of travel, wherein the at least a first nozzle includes a centerline of discharge that is substantially tangent with respect to the circumference of travel.

2. The mower deck of claim 1, wherein the spray width is substantially 25 degrees.

3. The mower deck of claim 1 wherein the circumference of travel of the cutting blade has a radius L from the center of rotation to the outer edge of the cutting blade, and wherein the nozzle is located substantially proximate to the circumference of travel within the rage of 0.8L to 1.2L.

4. The mower deck of claim 1, wherein the centerline of discharge of the nozzle forms an angle (Y) with a line extending through the nozzle and a center of rotation of the cutting blade, wherein angle Y is about 85 degrees.

5. A mower deck comprising:
   a mower deck housing having an inner surface and an outer surface;
   a first cutting blade;
   a second cutting blade, the first and second cutting blades being operatively rotatably connected with respect to the mower deck, the first cutting blade rotating in a first direction, and the second cutting blade rotating in a second opposite direction, wherein each of the cutting blades defines a circumference of travel marking the outer edge of the blade, and wherein a first axis is defined by the centers of rotation of the first and second cutting blades;
   a first nozzle;
   a second nozzle, wherein the first and second nozzles have first and second ends, the first ends of the nozzles extending into the interior of the mower deck housing, the second ends of the nozzles extending exterior to the mower deck housing, wherein the nozzles include an aperture for discharging an associated water stream;
   wherein the first nozzle is positioned aft of the first axis and outboard of the center of rotation of the first blade;
   wherein the second nozzle is positioned aft of the first axis and outboard of the center of rotation of the second blade; and
   wherein each of the first and second nozzles includes a centerline of discharge that is substantially tangent with respect to the circumference of travel of the respective proximal blade so that a portion of the water stream is channeled onto the blade such that the water sprayed in a substantially forward direction is carried by the momentum of the rotating first and second blades and propelled throughout the interior of the mower deck.

6. The mower deck of claim 5 wherein the circumference of travel of the cutting blade has a radius L from the center of rotation to the outer edge of the cutting blade, and wherein the nozzle is located substantially proximate to the circumference of travel within the rage of 0.8L to 1.2L.

7. The mower deck of claim 5, wherein the nozzles include an aperture for discharging an associated water stream having a spray width ranging between about 20 and 30 degrees.

8. The mower deck of claim 5, wherein the centerline of discharge of the nozzle forms an angle (Y) with a line extending through the nozzle and a center of rotation of the cutting blade, wherein angle Y is about 85 degrees.

9. A mower deck comprising:
   a deck housing having an interior and an exterior;
   a predetermined number of mowing blades operatively rotatably connected with respect to the deck housing, wherein each of the predetermined number of mowing blades has a radius L from the center of rotation to the outer edge of the each of the predetermined number of mowing blades;
   a predetermined number of nozzles having first and second ends respectively, the first ends of the predetermined number of nozzles extending into the interior of the mower deck housing, the second ends of the predetermined number of nozzles extending exterior to the mower deck housing, wherein the predetermined number of nozzles each include an aperture for discharging an associated water stream; and,
   wherein the predetermined number of nozzles is one less than the predetermined number of mowing blades, and wherein each of the predetermined number of nozzles is located proximate to one of the predetermined number of mowing blades within the rate of 0.8L to 1.2L.

10. A mower deck comprising:
    a mower deck housing having an inner surface and an outer surface;
    a first cutting blade;
    a second cutting blade;
    a third cutting blade positioned between said first and second cutting blades, the first, second and third cutting blades being operatively rotatably connected with respect to the mower deck, wherein each of the cutting blades defines a circumference of travel marking the outer edge of the blade, and wherein a first axis is defined as passing through the centers of rotation of the first and second cutting blades;
    a first nozzle;
    a second nozzle, wherein the first and second nozzle have first and second ends, the first ends of the nozzles extending into the interior of the mower deck housing, the second ends of the nozzles extending exterior to the mower deck housing, wherein each of the nozzles includes an aperture for discharging an associated water stream;

wherein the first nozzle is positioned aft of the first axis, outboard of the center of rotation of the first blade, and adjacent the circumference of travel of the first blade, and wherein the first nozzle includes a centerline of discharge that is directed between the center of rotation of the first cutting blade and the center of rotation of the third cutting blade; and wherein the second nozzle is positioned aft of the first axis, outboard of the center of rotation of the second blade, and adjacent the circumference of travel of the second blade, and wherein the second nozzle includes a centerline of discharge that is directed between the center of rotation of the second cutting blade and the center of rotation of the third cutting blade.

11. The mower deck of claim 10, wherein the nozzles include an aperture for discharging an associated water stream having a spray width ranging between about 20 and 30 degrees.

12. The mower deck of claim 10, wherein the centerline of discharge of each of the nozzles forms an angle (F) with a line extending through the respective nozzle and a center of rotation of the adjacent cutting blade, wherein angle F is less than or equal to 20 degrees.

13. The mower deck of claim 10 wherein the circumference of travel of the cutting blade has a radius L from the center of rotation to the outer edge of the cutting blade, and wherein the nozzle is located substantially proximate to the circumference of travel within the rage of 0.8L to 1.2L.

* * * * *